US008326668B2

(12) United States Patent
Basson et al.

(10) Patent No.: US 8,326,668 B2
(45) Date of Patent: Dec. 4, 2012

(54) MANAGING ENCOUNTERS WITH PERSONS

(75) Inventors: Sara H. Basson, White Plains, NY (US);
Dimitri Kanevsky, Ossining, NY (US);
Clifford Alan Pickover, Yorktown Heights, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 12/872,042

(22) Filed: Aug. 31, 2010

(65) Prior Publication Data

US 2012/0053980 A1 Mar. 1, 2012

(51) Int. Cl.
*G06Q 10/00* (2012.01)
(52) U.S. Cl. ...................... 705/7.16; 705/7.18
(58) Field of Classification Search .............. 705/7.16, 705/7.18
See application file for complete search history.

(56) References Cited

U.S. PATENT DOCUMENTS

| 7,386,464 B2 | 6/2008 | Robertson et al. | |
| 2006/0200374 A1* | 9/2006 | Nelken | 705/9 |
| 2009/0112986 A1 | 4/2009 | Caceres | |
| 2009/0164919 A1* | 6/2009 | Bates et al. | 715/757 |
| 2009/0248480 A1 | 10/2009 | Miksovsky | |
| 2009/0326800 A1* | 12/2009 | Kaloukis et al. | 701/201 |
| 2010/0027527 A1* | 2/2010 | Higgins et al. | 370/351 |
| 2010/0179756 A1* | 7/2010 | Higgins et al. | 701/210 |
| 2010/0211425 A1* | 8/2010 | Govindarajan | 705/8 |

FOREIGN PATENT DOCUMENTS

WO WO2009065637 A1 5/2009

OTHER PUBLICATIONS

U. Hengartner et al., "Protecting Access to People Location Information," International Conference on Security in Pervasive Computing: First International Conference, Mar. 12-14, 2003, 15 pages, Boppard, Germany.

* cited by examiner

*Primary Examiner* — Mark A Fleischer
(74) *Attorney, Agent, or Firm* — Anne V. Dougherty; Ryan, Mason & Lewis, LLP

(57) ABSTRACT

Techniques are disclosed for facilitating coordination of user activities in accordance with information processing systems and, more particularly, to techniques for managing encounters with persons using such information processing systems. For example, a method for facilitating user coordination of one or more activities comprises the following steps. User personal preference input for managing an encounter with at least one other person is accepted. Input of at least one user schedule entry is received. Schedule entries of the at least one other person are evaluated and it is automatically determined whether there is an overlap between the at least one user schedule entry and the schedule entries of the at least one other person. A response to a determined overlap is automatically determined. The user personal preference input may comprise an indication of whether the user wishes to avoid an encounter with the at least one other person or coordinate an encounter with the at least one other person.

25 Claims, 4 Drawing Sheets

400

MANAGING ENCOUNTERS WITH PERSONS

FIELD OF THE INVENTION

The present invention relates generally to facilitation of coordination of user activities in accordance with information processing systems and, more particularly, to techniques for managing encounters with persons using such information processing systems.

BACKGROUND OF THE INVENTION

People often go to areas or meetings that they would prefer to keep private, or at least private to a subset of people. These can include, by way of example only, visits to particular doctors, or interviews for particular jobs. As these events are currently managed, there is no mechanism to coordinate a person's appointments with any other person's appointments. This can result in awkward moments, whereby an individual "runs into" a colleague, boss, or friend when visiting a doctor, for example, for treatments that the individual would prefer not to be shared with those persons.

Note that, on the other hand, people may also relish the opportunity to coordinate visits to appointments with friends that use the same service. For example, an individual might opt to schedule a dentist appointment at the same time that a friend will be visiting that same practice.

SUMMARY OF THE INVENTION

Principles of the invention provide techniques for facilitating coordination of user activities in accordance with information processing systems and, more particularly, to techniques for managing encounters with persons using such information processing systems.

For example, in accordance with one aspect of the invention, a method for facilitating user coordination of one or more activities comprises the following steps. User personal preference input for managing an encounter with at least one other person is accepted. Input of at least one user schedule entry is received. Schedule entries of the at least one other person are evaluated and it is automatically determined whether there is an overlap between the at least one user schedule entry and the schedule entries of the at least one other person. A response to a determined overlap is automatically determined.

The user personal preference input may comprise an indication of whether the user wishes to avoid an encounter with the at least one other person or coordinate an encounter with the at least one other person.

The method may further comprise a step of assigning one or more weights indicating a strength of preference to avoid or coordinate an encounter with the at least one other person. Further, the method may further comprise selectively adjusting the one or more weights so as to increase or decrease the possibility of an occurrence of the encounter.

The automatically generated response to a determined overlap may comprise notifying at least one of the user and the at least one other person of the determined overlap. The automatically generated response to a determined overlap may further comprise automatically suggesting an alternative user schedule entry.

The encounter may comprise a schedule-based activity, by way of example only, one or more of an appointment, a reservation, and a meeting.

The method may further comprise accepting information from a social networking site when determining whether the overlap exists.

In one embodiment, the user and the at least one other person may be represented by respective avatars in a virtual world such that the encounter being managed is between the avatars in the virtual world.

Other aspects of the invention comprise apparatus and articles of manufacture for implementing and/or realizing the above-described method steps.

These and other features, objects and advantages of the present invention will become apparent from the following detailed description of illustrative embodiments thereof, which is to be read in connection with the accompanying drawings.

DETAILED DESCRIPTION OF THE INVENTION

Figure 1:
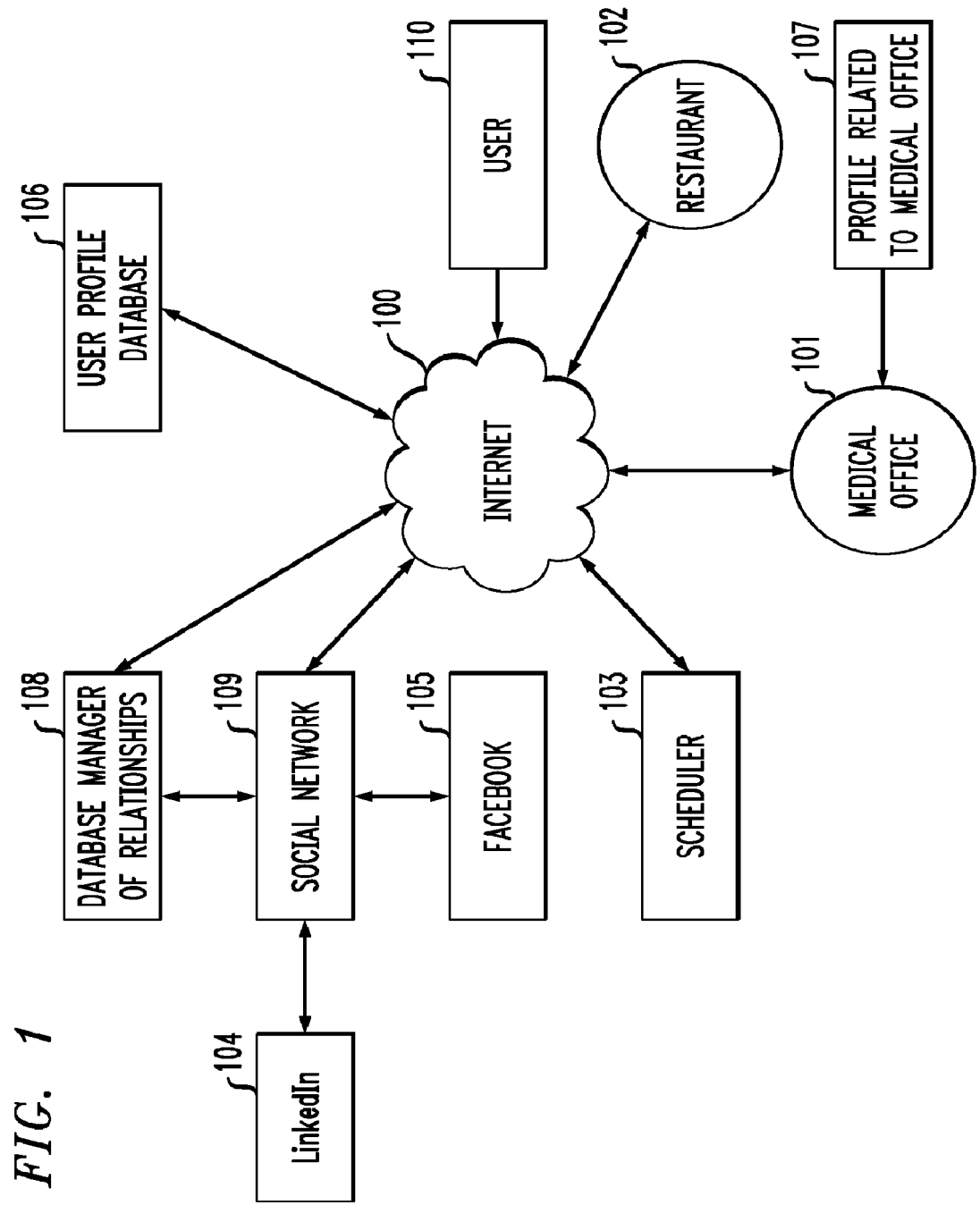
FIG. 1 illustrates an illustrative information processing system in which an encounter management method according to an embodiment of the invention is implemented.

Principles of the present invention will be described herein in the context of management of appointments and meeting such as, by way of example, a medical appointment or a meeting at a restaurant. It is to be appreciated, however, that the principles of the present invention are not limited to use in any particular appointment/meeting context but rather may be applied in accordance with any suitable scheduling environment where it is desirable to manage encounters with persons. For this reason, numerous modifications can be made to the embodiments shown that are within the scope of the present invention. That is, no limitations with respect to the specific embodiments described herein are intended or should be inferred.

Illustrative embodiments of the invention provide mechanisms whereby individuals can more easily coordinate their activities, to increase the likelihood of convergence with individuals that they prefer to meet or avoidance of individuals that they prefer not to meet.

It is realized that social networking tools such as Facebook™ (Facebook Inc., Palo Alto, Calif.) MySpace™ (MySpace Inc., Los Angeles, Calif.), and Twitter™ (Twitter Inc., San Francisco, Calif.) enable people to indicate when they will be going to particular places. In addition, many people maintain online calendar tools that mark appointments and other engagements. By "online," it is generally meant that a person uses a computing device (e.g., personal computer, laptop, personal digital assistant, cell phones, smart phone, etc.) to access one or more other computing devices (e.g., servers) that host a particular application (e.g., social network tool, calendar tool, etc.). The computing devices may communicate over a public network (e.g., Internet), a private network, or some combination of both public and private networks.

It is also realized that global positioning system (GPS) trackers on cell phones or other computing devices can provide the location of people within one's social network.

It is also realized that social networking tools also represent a person's extended network of friends and acquaintances.

It is also realized that places where people make appointments (e.g., doctors, dentists, hairdressers, restaurants, meetings, conferences, etc.) also have electronic mechanisms (e.g., Internet-based) to maintain calendar information.

Accordingly, illustrative embodiments of the invention provide techniques for allowing individuals to mark in their social networking tools whom they would or would not like to encounter ("run into") at appointments to the doctor, dentist, etc. These can be marked as per individual, or for an entire class such as, by way of example only, "exclude all work colleagues." The marking may be done such that it is not known to anyone other than the person doing the marking. However, in one embodiment, once the user's preferences are "marked," the processes of person avoidance and person convergence are transparent to even the user (e.g., the user's schedule gets automatically set or adjusted to satisfy the avoidance/convergence preferences of the user). Of course, in another embodiment, the user is notified of the scheduling overlap and can accept or reject the proposed alteration to the schedule.

Accordingly, by way of example, when an appointment is made for the doctor, dentist, conference, etc., the calendar tool of the professional links to the patient's Facebook page or calendar, e.g., Lotus Notes™ (IBM Corporation, Armonk, N.Y.) or Google™ (Google Inc., Mountain View, Calif.) calendar, to determine whether there is overlap between the patient's "do not meet" class and anyone who will be visiting the doctor (or other potential place of meeting) within that same time window.

In the event that there is overlap, the patient that has marked "do not meet" can be notified and told that someone from their "do not meet" category is scheduled for the same time. Therefore, the appointment time can be changed. This can be done either through explicit discussion; or, it can be done transparently whereby the patient is asked to change to another time without being notified that there is overlap with someone on their "do not meet" list.

To provide an extra management layer on top of Facebook or a calendar system, trackers on cell phones can also provide the immediate location of people in one's social network, thereby "encouraging" or "discouraging" the user to visit certain places within a particular time span. This may be performed in an anonymous fashion, so that no individual's privacy is at risk. Also, this service may be offered as an opt-in service.

Often, the encounters that individuals have in their lives, both good and bad, may have a profound impact on their lives; not only personal lives, but also with respect to jobs, business projects, interactions with managers and colleagues, etc Innovation in science, business, and technology has often been affected by both chance encounters and planned encounters.

The method can be extended to all schedule-based activities, by way of example only, movies, restaurants, conferences, hotels.

Furthermore, in accordance with illustrative principles of the invention, weights can be assigned indicating the strength of preference to meet or not to meet particular individuals in particular settings. For example, if a user very much wishes to increase or decrease the possibility of a chance encounter, this may be used as a selectable weighting factor in an equation that optimizes such encounters. For example, let us consider a vector of factors X=[x1, x2, . . . , xn], where each xi is a factor which is used to determine if individuals should be met in particular settings. Such examples of factors could include location of appointment (e.g., doctor, conference, etc.), privacy of meeting, calendars of other individuals, etc. The user can assign weights wi to each of the xi factors. Thus, the overall score is $$S = \sum_{i=1}^{n} wi \times xi.$$

If this score S is above a user determined threshold, then the user can decide not to meet a particular individual. The inventive encounter management methods may also be extended to "virtual worlds" as well, whereby participants can opt to avoid spaces and gatherings where another entity, such as an avatar, is scheduled to participate. As is known, a virtual world is an online community that often takes the form of a computer-based simulated environment, through which users can interact with one another and use and create objects. Virtual worlds are intended for its users to inhabit and interact, and the phrase today has become largely synonymous with interactive three dimensional virtual environments, where the users take the form of avatars visible to others graphically. These avatars are usually depicted as textual, two-dimensional, or three-dimensional graphical representations, although other forms are possible.

The inventive encounter management methods can also be extended to include "people that know people." For example, individuals can ask to be notified if anyone that knows "person X" (e.g., a CEO of a particular company) will be attending an event that they plan to attend. Thus, in a world in which social networking, job searching, and both virtual and non-virtual connections have evolved to play a key role in many people's lives, encounter management methods of the invention implemented in the general space of social networking have not only the potential to have a significant impact on the world but also to provide opportunities for revenue to service providers.

Referring initially to FIG. 1, an illustrative information processing system is depicted in which an encounter management method according to an embodiment of the invention is implemented.

As shown in this illustrative embodiment, a network 100, such as the Internet, connects all elements, components and modules associated with the system. For example, the Internet connects the system to medical office 101 and to restaurant 102.

The user 110 schedules an appointment with the medical office 101 or a reservation with the restaurant 102. It is assumed that the user is able to schedule an appointment or reservation by going online to a website of the medical office or restaurant. When the user connects to these sites, it is assumed that there is access to a profile of user preferences. This profile may have been created at an earlier time or concurrent with the making of the appointment. The user creates this profile through an online database (e.g., profile database 106), where it can enter its preferences for meeting others in different possible social encounters. This profile provides user priorities, such as whom the user does not want to meet at the places that he/she will be going. This profile can be stored in user profile database 106. A profile connected to medical office is denoted as 107.

Scheduler 103 for the medical office assigns the appointment to the user at a time when others on the "do not meet" list will not be present. Scheduler 103 gets information about whom the user does or does not want to meet from database manager 108. That is, the medical office 101 obtains profile 107 from database manager 108, which gets it from profile database 106. The database manager is connected through the Internet to social networks 109. Examples of social networks include, but are not limited to, Facebook 105 or LinkedIn 104.

Figure 2:
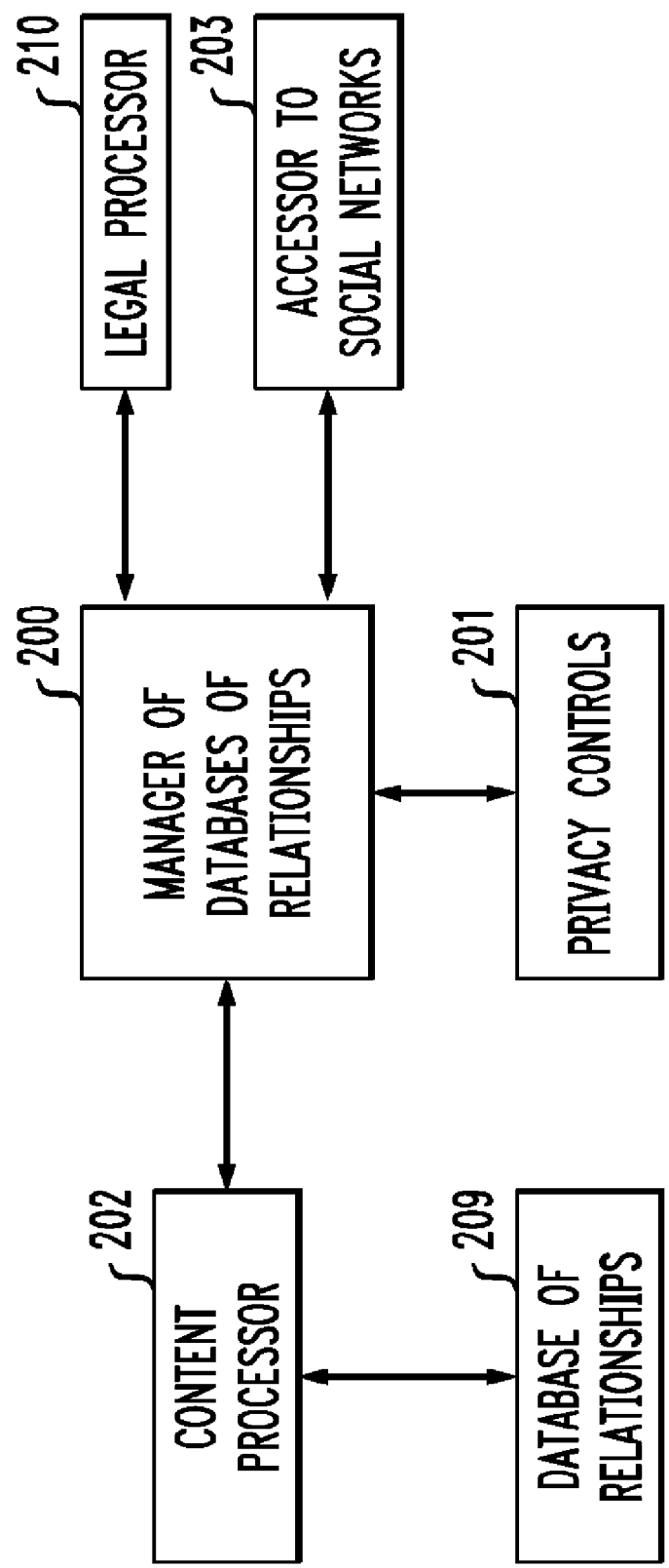
FIG. 2 illustrates management of a database according to an embodiment of the invention.

FIG. 2 illustrates database management of relationships according to an embodiment of the invention. It is to be appreciated that the components in FIG. 2 represent the main components that comprise the database manager 108 in FIG. 1. Thus, as shown, database manager of relationships 200 provides privacy controls 201. For example, the manager module makes sure that information that is gotten from any social network is not exposed for any other purposes. In order to protect the user's privacy, the system can introduce some randomness to the process, so that it is not possible to deduce the nature of the person's relationships. This can be particularly important for famous people, where there might be more curiosity about whom the person wants to meet or avoid. Legal processor 210 ensures that system works in accordance with privacy laws in a given state or country.

Database manager 200 also has access to different formats of different social networks via accessor 203. Content processor 202 determines from social network tools who are "friends" of the user by determining the nature of different relationships and the level of "separation" from the user. It is also possible to determine whether individuals know each other if they have pictures on each other's social networking page. Output from the database manager 200 goes to database of relationships 209.

Figure 3:
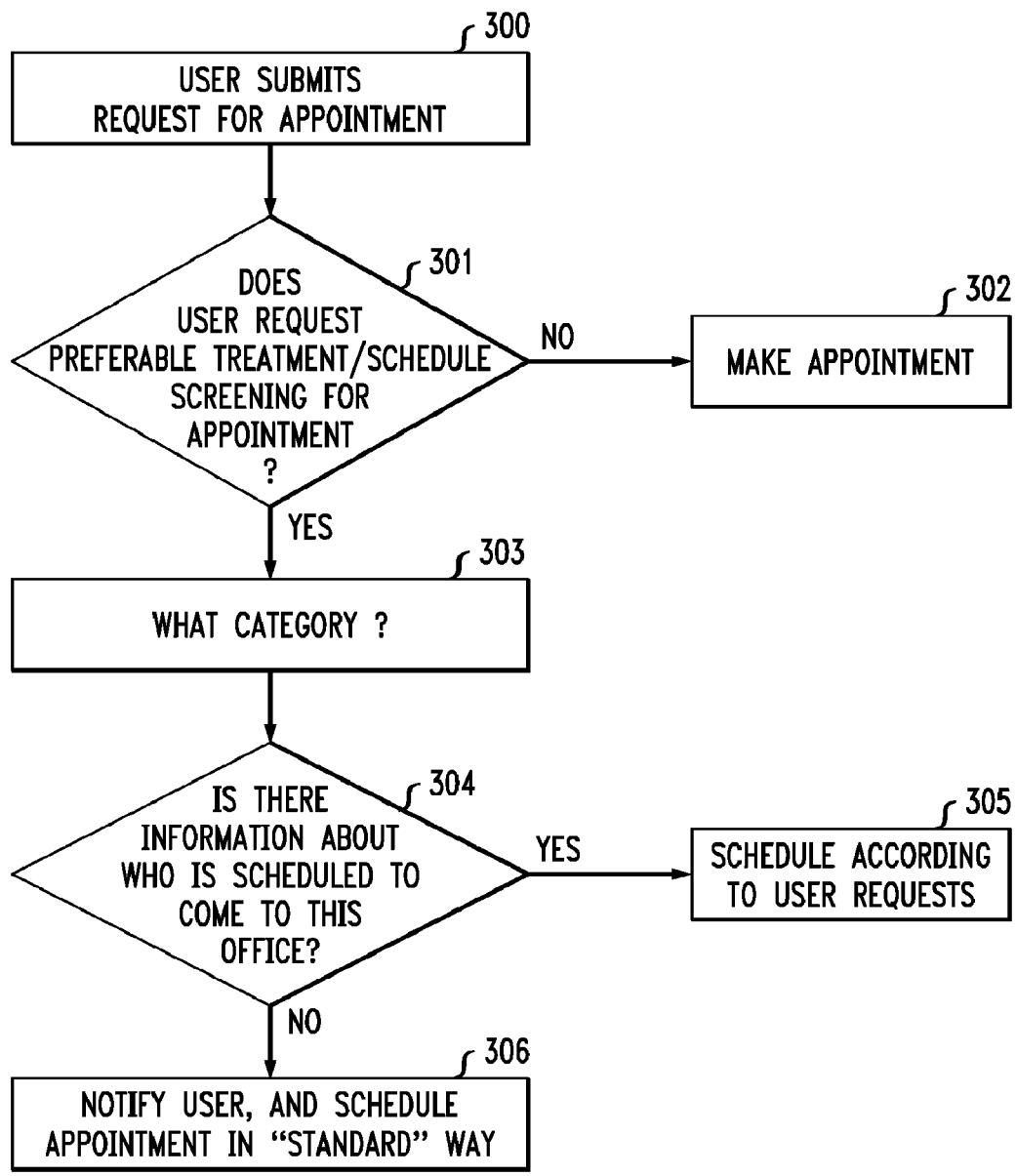
FIG. 3 illustrates a methodology for encounter management according to an embodiment of the invention.

FIG. 3 illustrates a methodology for encounter management according to an embodiment of the invention. In step 300, the user submits a request for appointment at website of professional, facility or business, e.g., doctor, hairdresser, etc. It is to be understood that the appointment could be made audibly over the telephone and entered into the system by the professional, facility or business.

The system determines whether the user has requested the service screening option for these appointments in step 301, i.e., does the user wish to implement encounter avoidance/convergence preferences. If not, then the system can schedule an appointment based on standard availability criteria in step 302. If the user has requested the service screening option in step 301, the system determines which category of screening is required in step 303. That is, by way of example, the user may specify to avoid overlapping appointments with others in the category of "family."

The system then determines whether there is information available about who else is scheduled to come to this office in step 304. If this information is available, appointments are scheduled as per the user's requested criteria in step 305. If information is unavailable, the user is notified and appointments are scheduled in "standard" way in step 306.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-3, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-3, can also include, as described herein, providing a system, wherein the system includes distinct modules (e.g., modules comprising software, hardware or software and hardware). By way of example only, the modules may include, but are not limited to, a database manager module, a user profile database module, one or more social network modules, a content processor module, a legal processor module, privacy control module, and one or more business-specific access module (e.g., website of medical office, restaurant, etc.). These and other modules may be configured, for example, to perform the steps described and illustrated in the context of FIGS. 1-3.

Figure 4:
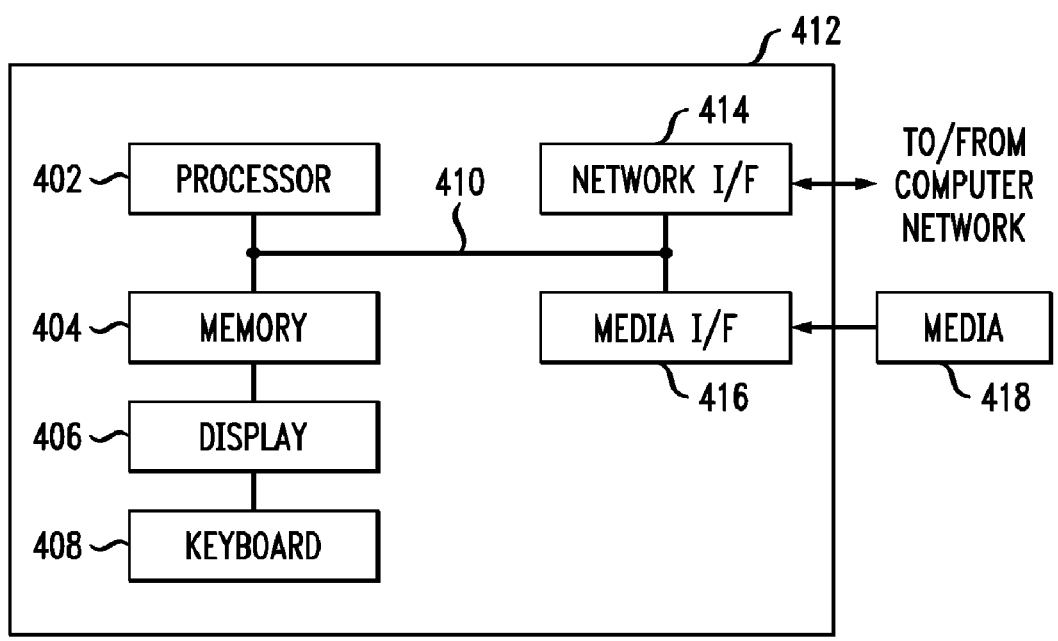
FIG. 4 is a diagram of a computing system for implementing one or more steps and/or components in accordance with one or more embodiments of the invention.

One or more embodiments can make use of software running on a general purpose computer or workstation. With reference to FIG. 4, such an implementation 400 employs, for example, a processor 402, a memory 404, and an input/output interface foiiiied, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 402, memory 404, and input/output interface such as display 406 and keyboard 408 can be interconnected, for example, via bus 410 as part of a data processing unit 412. Suitable interconnections, for example, via bus 410, can also be provided to a network interface 414, such as a network card, which can be provided to interface with a computer network, and to a media interface 416, such as a diskette or CD-ROM drive, which can be provided to interface with media 418.

A data processing system suitable for storing and/or executing program code can include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 408, display 406, pointing device, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 412 as shown in FIG. 4) running a server program. It will be understood that such a physical server may or may not include a display and keyboard.

Thus, it is to be understood that the computing system architecture shown in FIG. 4 may represent: a computing device used by the user to access the system; a computing device operated by a social networking site; a computing device hosting a calendar system; a computing device implementing a relationship database manager; a computing device implementing a profile database; and a computing device hosting a business-specific application (e.g., medical office, restaurant, etc.). It is to be further understood that multiple ones of these functions can be implemented on one computing device.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for facilitating user coordination of one or more activities, comprising steps of:
   accepting user personal preference input for managing a physical encounter with at least one other person in a physical location;
   receiving input from said user of at least one user schedule entry indicating a scheduled activity of said user;
   obtaining schedule entries indicating scheduled activities of said at least one other person;

evaluating schedule entries of the at least one other person and automatically determining whether there is an overlap between the at least one user schedule entry and the schedule entries of the at least one other person such that there is a possibility that the user may physically encounter the at least one other person based on a determined overlap; and automatically generating a response to the determined overlap based on said user personal preference, wherein the steps of accepting, receiving, evaluating and generating are performed by a computer.

2. The method of claim 1, wherein the user personal preference input comprises an indication of whether the user wishes to avoid an encounter with the at least one other person or coordinate an encounter with the at least one other person.

3. The method of claim 2, further comprising a step of assigning one or more weights indicating a strength of preference to avoid or coordinate an encounter with the at least one other person.

4. The method of claim 3, further comprising a step of selectively adjusting the one or more weights so as to increase or decrease the possibility of an occurrence of the encounter.

5. The method of claim 1, wherein the automatically generated response to a determined overlap comprises notifying at least one of the user and the at least one other person of the determined overlap.

6. The method of claim 1, wherein the automatically generated response to a determined overlap comprises automatically suggesting an alternative user schedule entry.

7. The method of claim 1, wherein the encounter comprises a schedule-based activity.

8. The method of claim 7, wherein the schedule-based activity comprises one or more of an appointment, a reservation, and a meeting.

9. The method of claim 1, further comprising a step of accepting information from a social networking site when determining whether the overlap exists.

10. The method of claim 1, wherein the user and the at least one other person are represented by respective avatars in a virtual world such that the encounter being managed is between the avatars in the virtual world.

11. Apparatus for facilitating user coordination of one or more activities, comprising:
   a memory; and one or more processor devices operatively coupled to the memory and configured to:
   accept user personal preference input for managing a physical encounter with at least one other person in a physical location;
   receive input from said user of at least one user schedule entry indicating a scheduled activity of said user;
   obtain schedule entries indicating scheduled activities of said at least one other person; evaluate schedule entries of the at least one other person and automatically determining whether there is an overlap between the at least one user schedule entry and the schedule entries of the at least one other person such that there is a possibility that the user may physically encounter the at least one other person based on a determined overlap; and
   automatically generate a response to the determined overlap based on said user personal preference.

12. The apparatus of claim 11, wherein the user personal preference input comprises an indication of whether the user wishes to avoid an encounter with the at least one other person or coordinate an encounter with the at least one other person.

13. The apparatus of claim 12, wherein the one or more processor devices are further configured to assign one or more weights indicating a strength of preference to avoid or coordinate an encounter with the at least one other person.

14. The apparatus of claim 13, wherein the one or more processor devices are further configured to permit selective adjustment of the one or more weights so as to increase or decrease the possibility of an occurrence of the encounter.

15. The apparatus of claim 11, wherein the automatically generated response to a determined overlap comprises notifying at least one of the user and the at least one other person of the determined overlap.

16. The apparatus of claim 11, wherein the automatically generated response to a determined overlap comprises automatically suggesting an alternative user schedule entry.

17. The apparatus of claim 11, wherein the encounter comprises a schedule-based activity.

18. The apparatus of claim 17, wherein the schedule-based activity comprises one or more of an appointment, a reservation, and a meeting.

19. The apparatus of claim 11, wherein the one or more processor devices are further configured to accept information from a social networking site when determining whether the overlap exists.

20. The apparatus of claim 11, wherein the user and the at least one other person are represented by respective avatars in a virtual world such that the encounter being managed is between the avatars in the virtual world.

21. An article of manufacture for facilitating user coordination of one or more activities, the article of manufacture comprising a computer readable storage medium having tangibly embodied thereon computer readable program code which, when executed, causes a computer to:
   accept user personal preference input for managing a physical encounter with at least one other person in a physical location;
   receive input from said user of at least one user schedule entry indicating a scheduled activity of said user;
   obtain schedule entries indicating scheduled activities of said at least one other person; evaluate schedule entries of the at least one other person and automatically determining whether there is an overlap between the at least one user schedule entry and the schedule entries of the at least one other person such that there is a possibility that the user may physically encounter the at least one other person based on a determined overlap; and
   automatically generate a response to the determined overlap based on said user personal preference.

22. The article of claim 21, wherein the user personal preference input comprises an indication of whether the user wishes to avoid an encounter with the at least one other person or coordinate an encounter with the at least one other person.

23. The article of claim 22, wherein the computer readable storage medium has tangibly embodied thereon computer readable program code which, when executed, further causes the computer to assign one or more weights indicating a strength of preference to avoid or coordinate an encounter with the at least one other person.

24. The article of claim 23, wherein the computer readable storage medium has tangibly embodied thereon computer readable program code which, when executed, further causes the computer to permit selective adjustment of the one or more weights so as to increase or decrease the possibility of an occurrence of the encounter.

25. The article of claim 21, wherein the encounter comprises a schedule-based activity.

* * * * *